United States Patent

Badal

[15] 3,681,677

[45] Aug. 1, 1972

[54] ARRANGEMENT FOR STARTING OF THYRISTORS, INCLUDING THE ADJUSTMENT OF THE LEADING EDGE OF THE CONTROL PULSE ON THE PRIMARY END OF AN IMPULSE TREATMENT

[72] Inventor: Jiri Badal, Praha, Czechoslovakia

[73] Assignee: CKD Praha, Oborovy podnik, Prague, Czechoslovakia

[22] Filed: July 7, 1971

[21] Appl. No.: 160,312

[30] Foreign Application Priority Data

July 8, 1970 Czechoslovakia .................4775

[52] U.S. Cl...............321/11, 307/252 J, 307/252 N, 307/268

[51] Int. Cl..........................H02m 1/18, H03k 17/00

[58] Field of Search...321/11, 27 R; 307/252 L, 252 Q, 307/252 J, 252 N, 263, 268

[56] References Cited

UNITED STATES PATENTS 3,596,168 7/1971 Hengsberger...............321/11 X
3,611,106 10/1971 Mooney......................321/11 X

FOREIGN PATENTS OR APPLICATIONS 1,076,273 7/1967 Great Britain..................321/11
1,083,946 9/1967 Great Britain .............321/27 R

*Primary Examiner*—William H. Beha, Jr.
*Attorney*—Richard Low and Murray Schaffer

[57] ABSTRACT

An arrangement for starting of thyristors providing a steep leading edge of the control pulse having an impulse transformer transforming the first part of the actuating pulse by a part of the primary winding of the transformer at a higher ratio of transformation, than the second part of the control pulse which is transformed by the whole primary winding, using a capacitor and a diode for controlling this process.

5 Claims, 2 Drawing Figures

PATENTED AUG 1 1972 3,681,677

JIŘÍ BÁDAL
INVENTOR

BY [signature]
ATTORNEY

ARRANGEMENT FOR STARTING OF THYRISTORS, INCLUDING THE ADJUSTMENT OF THE LEADING EDGE OF THE CONTROL PULSE ON THE PRIMARY END OF AN IMPULSE TREATMENT

BACKGROUND OF THE INVENTION

This invention relates to an arrangement for starting of thyristors including the adjustment of the leading edge of the control pulse on the primary end of the impulse transformer.

Considerable demands are made on control pulses of thyristors, particularly on the steepness of their leading edge, on the starting amplitude and on their duration. No difficulties are experienced in obtaining with known semiconductor generators a pulse having a steepness of for instance 0.5 to 3 A/$\mu$ sec, a starting amplitude of 1 to 3 A, a maintained amplitude of about 0.5 A and a length of 300 to 1,500 $\mu$ sec. A galvanic isolation must be however provided between the control electrode, which has a variable potential of the power circuit and the impulse generators which have a potential close to the ground potential. The galvanic isolation is provided in the impulse transformer. The requirement of a high steepness of the leading edge of the pulse is however thereby in contradiction with the requirement of the length of the pulse.

Limitations of the steepness of the leading edge of the control pulse are determined by stray inductances between the primary and secondary winding of the transformer. A reduction of this stray inductance to a minimum is a rather pretentious technological task, it involves a reduction of distances between both windings or even their staggering, what is at the requirement to maintain the level of the test voltage between 6.5 to 10 KV rather pretentious on special isolating material. The reduction of distances between the windings causes also a reduction of the field gradient and thus leads to corona discharges.

As the minimum control signal, capable to start the thyristor for some types of thyristors amounts to tens of milliampers [even for thyristors of large output], even a small parasitic signal can cause a start of the thyristor at an unwelcomed moment, what may lead to breakdowns. It is therefore necessary to suppress all interfering signals. Interfering signals can be generated both in the supply line and in the impulse transformer. The thyristor cathode fluctuates around a potential which changes due to switching of other thyristors rather quickly with respect to the ground potential, with the consequence that the potential between the secondary and primary winding of the impulse transformer changes in a similar manner. Due to unsymmetry of capacitances between both windings an interference signal is induced in the secondary winding, which may cause the starting of the thyristor. A signal is equally induced due said capacitive couplings into the primary winding, from which it is induced by the magnetic coupling between both windings into the secondary winding and may equally cause the opening of the thyristor.

SUMMARY OF THE INVENTION.

It is an object of this invention to provide control pulses of thyristors with a steep leading edge.

It is another object of this invention to obtain control pulses of thyristors of sufficient duration.

It is still another object of this invention to obtain a large starting amplitude of these signals.

It is a further object of this invention to maintain stray inductances of the used impulse transformer within reasonable limits.

Bearing these and other objects in mind an impulse transformer is applied, having two primary windings connected in series, the start of the first primary winding being connected to the positive terminal of a source of DC supply voltage by way of a capacitor and the end of which to a switch, the end of the second primary winding being connected with the start of the first primary winding and the start of the second primary winding connected by way of a series combination of a resistor and a diode to the positive terminal of the source of DC supply voltage. The diode is connected to this positive terminal with its anode. A screening foil of the secondary winding of the impulse transformer is connected with the source of the DC supply voltage. The distance of the first primary winding of the impulse transformer with respect to the secondary winding is smaller than that of the second primary winding. The number of turns of the first primary winding of the impulse transformer is 0.5 to 5 times the number of turns of the secondary winding. The number of turns of the second primary winding of the impulse transformer is 0.5 to 20 times the number of turns of the first primary winding of the impulse transformer.

DESCRIPTION OF DRAWINGS

An examplary embodiment of the object of this invention is shown in the accompanying drawing where.

DESCRIPTION OF PREFERRED EMBODIMENT

The impulse transformer TR has two primary windings I*a*, I*b* connected in series and a secondary winding II, connected to the cathode and to the control electrode of the thyristor T. The start of the primary winding I*a* is connected to the positive terminal of a source of a DC supply voltage by way of a capacitor C and to the end of the second primary winding I*b*, the end of the first primary winding I*a* is connected to a switch S. The start of the second primary winding I*b* is connected by way of a series combination of a resistor R and of a diode D to the positive terminal of the source of DC supply voltage.

Figure 1:
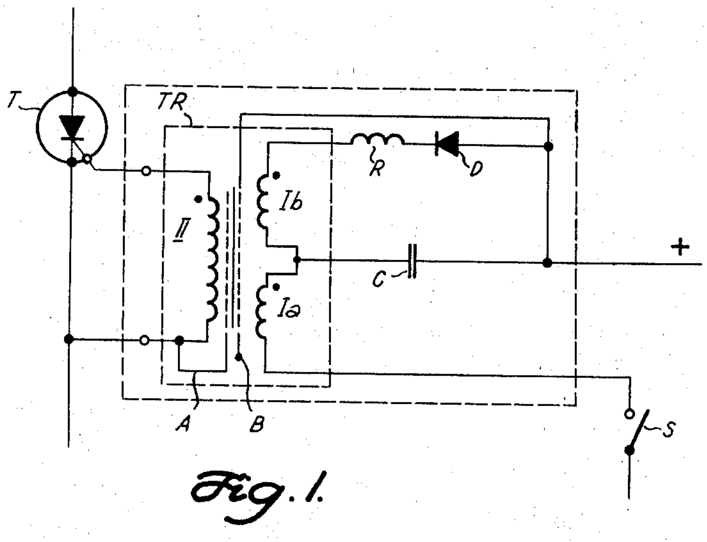
FIG. 1 shows a schematic layout of the whole arrangement and FIG. 2 at the bottom the course of the primary impulse and above it the course of the secondary impulse.
Figure 2:
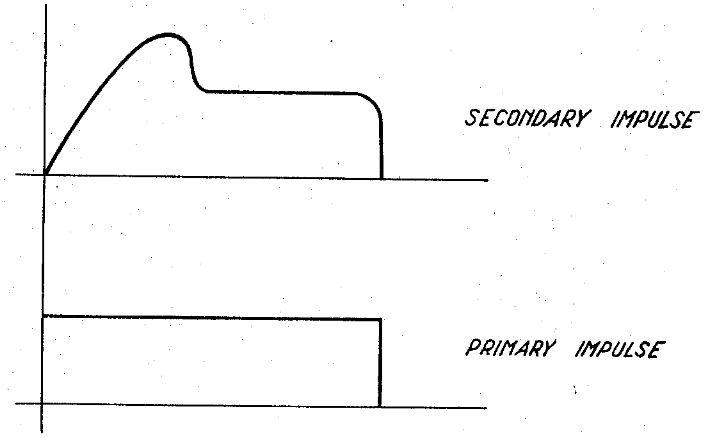

The impulse transformer TR has two screenings A and B the first one A being connected with the cathode of the thyristor T, the second B with a stable potential, either with the ground or with the source of supply voltage. At the moment of arrival of a control impulse [closing of switch S] an impulse arrives to the primary winding I*a* over the capacitor C, which is transmitted to the secondary winding II and thus to the control electrode of thyristor T. At the start of the second primary winding Ib indicated by a dot a signal is generated, which cannot pass over the diode D, the winding I*b* remains therefore without current. After the capacitor C becomes charged, a current starts to flow over the diode D, the resistor R and over the sindings I*b*, I*a* connected in series. Thus the ratio of transformation is reduced several times with respect to the condition where the current passed through capacitor C. At the bottom of FIG. 2 the primary impulse of the impulse transformer is indicated, at the top the corresponding secondary impulse generated on the control electrode of the thyristor T.

The leading edge of the impulse is determined by the stray reactance between the secondary and first primary windings of the impulse transformer, which stray reactance may be kept relatively low, as the first primary winding has a small number of turns and is closest to the secondary winding. The starting amplitude of the impulse is determined by the ratio of transformation between the secondary and first primary winding, it is therefore high. The remaining second part of the impulse is thereafter transmitted by both primary windings connected in series. In that case the stray reactance does not matter as the second primary winding has a large number of turns and is capable to transmit also a large voltage area and thus also the remaining second part of the impulse, which is sufficient to maintain the thyristor opened. After the impulse is finished, the magnetic flux of the transformer drops again to its original magnitude determined by properties of the magnetic material or of the air gap.

As axample the following values of different elements are indicated : Secondary winding II 50 turns, first primary winding I*a* 50 turns, second primary winding I*b* 150 turns, resistor R 100 Ω, capacitor C 0.47 μF.

I claim:

1. An arrangement for starting of thyristors including the adjustment of the leading edge of the control pulse, comprising in combination an impulse transformer having two primary windings connected in series and a secondary winding, a thyristor, a resistor, a diode, a capacitor, a source of DC supply voltage, switch means, the secondary winding of the impulse transformer connected to the cathode and to the control electrode of the thyristor, the start of the first primary winding of the impulse transformer connected to the positive terminal of the source of DC supply voltage by way of the capacitor, the end of the first primary winding connected to the switch means, the end of the second primary winding connected with the start of the first primary winding, the start of the second primary winding connected over a series combination of the resistor and diode to the positive terminal of the source of DC supply voltage, the diode connected to this positive terminal of the DC supply voltage with its anode.

2. An arrangement as in claim 1 comprising a screening foil of the secondary winding of the impulse transformer connected with the source of DC supply voltage.

3. An arrangement as in claim 1, the distance of the primary winding of the impulse transformer from its secondary winding being smaller than that of the second primary winding.

4. An arrangement as in claim 1, the number of turns of the primary winding of the impulse transformer being 0.5 to 5 times the number of turns of the secondary winding of the impulse transformer.

5. An arrangement as in claim 4 the number of turns of the second primary winding being 0.5 to 20 times the number of turns of the secondary winding of the impulse transformer.

* * * * *